June 8, 1926.
A. F. SHORE
1,588,199
SPRING SUPPORT FOR VEHICLES
Filed Feb. 12, 1924
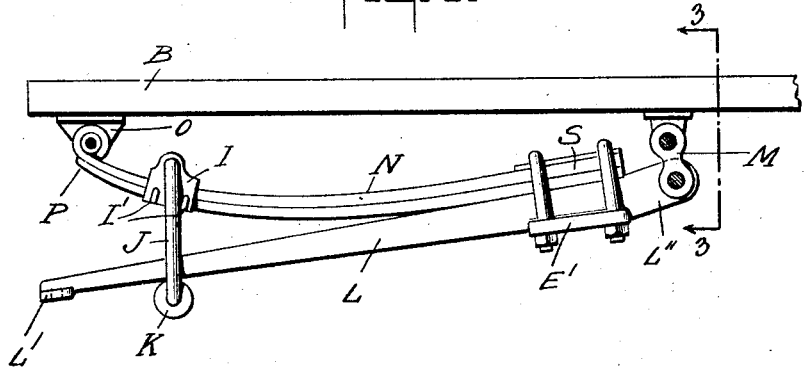
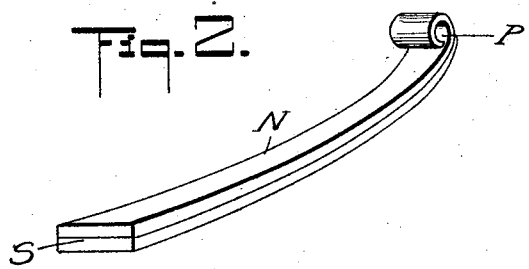
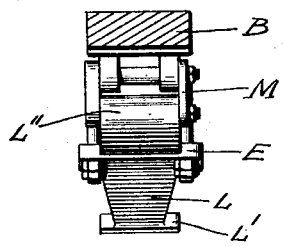
Albert F. Shore INVENTOR
BY Geo. H. Hoffman ATTORNEY Patented June 8, 1926.

1,588,199

UNITED STATES PATENT OFFICE.

ALBERT F. SHORE, OF NEW YORK, N. Y.

SPRING SUPPORT FOR VEHICLES.

Application filed February 12, 1924. Serial No. 692,405.

This invention relates to spring-supports for vehicles and more particularly to so-called leaf-spring suspension systems for vehicles, the present application being related to my earlier application, Serial No. 445,101, filed February 15, 1921, which has now become Patent No. 1,520,482, patented December 23, 1924.

The main object of the invention is to provide a simple construction of this character which will give the maximum of supporting power, stroke and elasticity, with the minimum of cross-section and weight.

A further object is to decrease the creeping tendency between the two members connected by the springs, and also to reduce the transmission of longitudinal and transverse vibrations.

Another object is to reduce or limit the extent of rebound.

Still another important object is to provide a spring-support of the type described, in which the maximum supporting power for a given weight of spring metal is obtained by using comparatively heavy individual leaves which gradually taper toward the eye-carrying extremity of the spring both in width and thickness. By the use of this type of spring, a single leaf-spring is as elastic and strong as a plurality of thinner leaves. It is, however, desirable to use at least two leaves, as a safety factor. The increased stroke is obtained by the use of a thinner and shorter spring, in the usual limited space, while increased elasticity is obtained by the use of a comparatively soft spring, and which, instead of weakening by the flattening of its curve under action of overload, will provide an increased length of bearing contact near the point of support. This permits the use of a spring of comparatively light construction.

The foregoing and other objects of the invention will be hereinafter described and claimed, and are illustrated in the accompanying drawings, in which—

Figure 1 is an elevation of my device, herein shown as applied to the under portion of the frame of a vehicle and extending lengthwise thereof;

Fig. 2 is a detail, showing, in perspective, the spring member of the device; and Fig. 3 is a section in the line 3—3, Fig. 1, and shows the pivotal connection between the spring-support and the vehicle body.

Similar characters designate like parts in the several figures of the drawings.

Referring to the drawings, B designates the under portion of the frame of a vehicle, having my improved spring-support applied thereto and extending lengthwise thereof. This support, in the construction illustrated, comprises a lever L, preferably of comparatively stiff material, having one of its ends L' connected (preferably rigidly) to the axle of the vehicle, while its other end L'' has a link or shackle connection M with the frame B. Adjacent to this end L'', the lever L is connected rigidly by a clamp E' to one end of a quarter-elliptical leaf-spring N, the other end P of which spring is fulcrumed on a fixed bearing O, secured to the frame B. While the lever L may be made in the form of a leaf-spring, it is preferable to make it of non-laminated metal and of a lesser degree of elasticity than the spring-member N.

The preferred form of the spring is shown in the drawings as made up of two leaves, each reduced in width and thickness from its pivoted end P toward its load-supporting end S, though the spring may be made up of any desired number of laminations or leaves, and which may or may not be reduced in width and thickness, as hereinbefore explained. Creeping action is eliminated by the use of this construction, one end L'' of the device being rigidly hinged to the body frame B, while the other end P is fulcrumed on the fixed bearing O, which, in turn, is secured to said body frame B. Moreover, transverse vibrations are reduced by the comparative softness under light loads and increasing strength under heavy loads, by reason of the increased length of bearing contact of the spring member N near the point of support S on lever L, while undue rebound may be checked or limited by a link J, fastened preferably to the upper leaf of the member N and embracing the lower leaf of said member, and which construction permits full compression but automatically arrests recoil beyond a predetermined point. The recoil-arresting means is shown herein as consisting of the bearings I, secured to the member N, and through which bearings extends the pivotally secured link J, embracing the lever L and the spring N, respectively, and carrying on the lower side of the lever L a cushioning roller K, made of rubber or other suitable soft material. Lugs I' on the bearings I, prevent the link J from swinging outwardly too far.

It will thus be seen that the link J, with its roller K, while permitting full compression, will prevent excessive rebounds after the spring has been compressed under a sudden increase of load.

In the embodiment of the invention herein illustrated, a two-leaf spring is employed, each leaf being shown as reduced in both width and thickness toward its load-supporting end, and the reduced extremity of the second, or auxiliary, leaf, extends a distance beyond the center of the eye formed at the extremity of the main leaf of the spring member N.

It is obvious from the drawings that the recoil-arresting means is so fashioned and positioned that the spring N is held normally under light compression by the link J and its compressible roller K, this arrangement affording smoother action of the spring at the beginning of compression under shock than would be the case were said spring not held normally under slight compression.

It is, of course, understood that various changes in the construction shown and described herein, may be made without departing from the scope of my invention as set forth in the appended claims.

What I claim is:

1. A spring-support for vehicles, comprising a vehicle frame and axle, a lever supported at one end on said axle and having at its other end a pivotal link connection with the frame, a leaf-spring attached at its less resilient end to the lever adjacent to said link connection and having its resilient end fulcrumed directly on the vehicle frame, and a link secured to the spring and embracing said spring and the lever and normally holding said spring under slight compression, said link also being adapted to arrest or limit the rebound of the frame when the vehicle is subjected to undue road shocks.

2. A spring-support for vehicles, comprising a vehicle frame and axle, a lever supported at one end on said axle and having at its other end a pivotal link connection with the frame, and a leaf-spring attached at its less resilient end to the lever adjacent to said link connection and having its resilient end fulcrumed directly on the vehicle frame, said leaf-spring being reduced in width and thickness toward its load-supporting end.

In testimony whereof, I affix my signature.

ALBERT F. SHORE.